E. MAYNARD.
Cartridge.
No 45,420.
Patented Dec. 13, 1864.
Fig: 1.
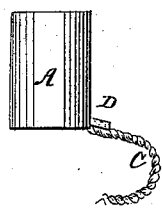
Fig: 2.
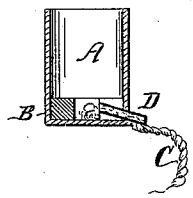
Fig: 3.
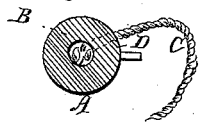
Witnesses:
Chas H Anderson
Randolph Leigh Jr.
Edward Maynard.
By Robbins & Burr
Attorneys

UNITED STATES PATENT OFFICE.

EDWARD MAYNARD, OF WASHINGTON, DISTRICT OF COLUMBIA.

IMPROVEMENT IN PRIMING METALLIC CARTRIDGES.

Specification forming part of Letters Patent No. 45,420, dated December 13, 1864.

*To all whom it may concern:*

Be it known that I, EDWARD MAYNARD, of the city of Washington, in the District of Columbia, have invented a new and useful Improvement in Primed Cartridges; and I do hereby declare that the following is a full, clear, and exact description thereof, reference being had to the accompanying drawings, making a part of this specification, and in which—

Figure 1 is an elevation of my improved cartridge; Fig. 2, a vertical central section of the same; and Fig. 3, a cross-section in the line $x\ x$ of Fig. 1. (See thin drawing.)

Similar letters indicate corresponding parts in each of the figures.

The object of my invention is to produce cheaply a reliable cartridge primed at one point only, and which shall be peculiarly adapted for use in the United States muskets so altered as to become breech-loading guns, in the manner described in my patent of October 30, 1860, and in the specification of an improvement thereon, herewith filed, in a separate application for Letters Patent.

To accomplish my object, I combine a simple percussion tube or primer, D, with a metallic cartridge by passing it through an aperture in the side thereof, as seen in Figs. 1, 2, and 3 of the drawings. This combination is not in itself novel, but my invention consists in a novel mode of confining and supporting the inner end of the priming-tube D, by causing it to pass through an annular wad, B, of papier-maché, or other suitable material, fixed in the bottom of the cartridge.

This wad B is made in the shape of a ring, so that the knotted end of the retracting-cord used in connection with all cartridges to be fired from my improved breech-loading gun, as patented October 30, 1860, may be inclosed in the center thereof. To receive this cord, an aperture is pierced through the wad from its inner to its outer periphery, and the outer end of the cord extending from the wad is then passed through an aperture in the side of the cartridge and depends therefrom, as seen in Figs. 1 and 2. The wad, when slipped into its place in the interior of the cartridge, thus incloses the knotted end of the cord, which is thereby prevented from slipping out. When the wad is thus fixed in the bottom of the cartridge and held by the retracting-cord, it forms a solid support for the inner end of the long, slim percussion-tube or hollow wire D, Fig. 2, which contains the fulminate. This priming-tube is driven into an aperture pierced in the side of the cartridge-case, and through the wad to its inner central cavity, until its inner end reaches this cavity. Its outer end will then project slightly beyond the exterior surface of the cartridge, as seen in the drawings, to receive the blow of the gun-hammer or hammer-rod. By dipping the tube D in a varnish or cement before driving it into place, the joint between the tube and cartridge may be made water-proof.

I contemplate the use of a thick annular layer of cement in place of the wad B, the cement to be so molded as to have substantially the form of said wad B, as described. In this case the percussion-tube D is to be placed in the cartridge and pressed through the cement before the latter has become fully hardened.

Having thus fully described my improvement in primed metallic cartridges, what I claim therein as new, and desire to secure by Letters Patent, is—

The combination of a wad, B, of any suitable material, with the interior of a cartridge, A, so as to form a firm support for the inner end of a priming-tube, D, passing out through the side of said cartridge, substantially in the manner herein set forth.

EDWARD MAYNARD.

Signed in presence of—
  GEO. W. MAYNARD,
  J. H. H. DOTY.